(12) United States Patent
Lee et al.

(10) Patent No.: US 10,116,912 B2
(45) Date of Patent: Oct. 30, 2018

(54) METHOD OF DISPLAYING AN IMAGE AND DISPLAY DEVICE FOR PERFORMING THE SAME

(71) Applicant: Samsung Display Co., Ltd., Yongin, Gyeonggi-do (KR)

(72) Inventors: Chang-Hoon Lee, Seoul (KR); Hak-Sun Kim, Seoul (KR); Jong-In Baek, Suwon-si (KR); Yi-Joon Ahn, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 459 days.

(21) Appl. No.: 14/661,294

(22) Filed: Mar. 18, 2015

(65) Prior Publication Data

US 2016/0021366 A1 Jan. 21, 2016

(30) Foreign Application Priority Data

Jul. 15, 2014 (KR) ........................ 10-2014-0089120

(51) Int. Cl.
*H04N 13/02* (2006.01)
*H04N 13/00* (2018.01)

(52) U.S. Cl.
CPC ....... *H04N 13/026* (2013.01); *H04N 13/0022* (2013.01); *H04N 13/0033* (2013.01)

(58) Field of Classification Search
CPC ........... H04N 13/0022; H04N 13/0033; H04N 13/026
See application file for complete search history.

(56) References Cited

U.S. PATENT DOCUMENTS

| | | | |
|---|---|---|---|
| 2012/0090005 A1* | 4/2012 | Marlow | G06Q 30/0241 725/42 |
| 2013/0216204 A1 | 8/2013 | Kulakov | |
| 2014/0160256 A1* | 6/2014 | Avrahami | H04N 13/0022 348/51 |

FOREIGN PATENT DOCUMENTS

| | | |
|---|---|---|
| JP | 5245026 B2 | 4/2013 |
| KR | 10-1999-0048705 A | 7/1999 |
| KR | 10-2015-0135660 A | 12/2015 |
| WO | WO 2013/062180 A1 | 5/2013 |
| WO | WO 2013-065900 A1 | 5/2013 |

* cited by examiner

*Primary Examiner* — Sathyanaraya V Perungavoor
*Assistant Examiner* — Peet Dhillon
(74) *Attorney, Agent, or Firm* — Lewis Roca Rothgerber Christie LLP

(57) ABSTRACT

A method of display an image and a display device for performing the same are disclosed. In one aspect, the method includes receiving image data for a content image, determining a modulation region and a peripheral region in the content image and generating a left-eye content image and a right-eye content image based on the image data for the content image such that the modulation region has a three-dimensional depth. The method further includes displaying the left-eye content image and the right-eye content image and periodically changing the three-dimensional depth of the modulation region by changing a modulation distance between the modulation region in the left-eye content image and the modulation region in the right-eye content image based at least in part on a periodic modulation reference timing.

20 Claims, 10 Drawing Sheets

METHOD OF DISPLAYING AN IMAGE AND DISPLAY DEVICE FOR PERFORMING THE SAME

CROSS-REFERENCE TO RELATED APPLICATIONS

This application claims priority under 35 U.S.C. § 119 to Korean patent Application No. 10-2014-0089120 filed on Jul. 15, 2014, the disclosure of which is hereby incorporated by reference herein in its entirety.

BACKGROUND

Field

The described technology generally relates to a method of displaying an image and a display device for performing the same.

Description of the Related Technology

Recently, due to the increase in display panels having slim profiles and low power consumption, they have been employed in numerous types of electronic devices. For example, slim profile display panels are employed in mobile phones and tablet computers which are widely used due to their portability advantage. These mobile phones and tablets can provide a viewer with various content, regardless of the location or time of day. Accordingly, viewers can watch visual content via a mobile phone or tablet when away from home and the time periods during which viewers watch visual content are increasing.

However, when a viewer watch content over an extended period of time, it results in tired eyes, which may have a deleterious effect on one's eyesight, due to the light generated from the display panel.

SUMMARY OF CERTAIN INVENTIVE ASPECTS

One inventive aspect is a method of displaying an image that can protect a viewer's eyes.

Another aspect is a display device for performing the method of displaying an image.

Another aspect is a method of displaying an image including receiving image data for a content image, determining a modulation region and a peripheral region in the content image, generating a left-eye content image and a right-eye content image based on the image data for the content image such that the modulation region has a three-dimensional depth, displaying the left-eye content image and the right-eye content image, and periodically changing the three-dimensional depth of the modulation region by changing a modulation distance between the modulation region in the left-eye content image and the modulation region in the right-eye content image on a basis of periodic modulation reference timing.

In example embodiments, a period of the modulation reference timing may be substantially the same as a desired blinking period of eyes.

In example embodiments, the modulation region may be recognized closer than the peripheral region when the three-dimensional depth of the modulation region has a positive depth. The modulation region may be recognized farther than the peripheral region when the three-dimensional depth of the modulation region has a negative depth.

In example embodiments, the operation of periodically changing the three-dimensional depth of the modulation region may include adjusting the modulation distance to a first distance at a first modulation frame period prior to the modulation reference timing such that the three-dimensional depth of the modulation region has a first depth, and adjusting the modulation distance to a second distance at a second modulation frame period subsequent to the modulation reference timing such that the three-dimensional depth of the modulation region has a second depth.

In example embodiments, the first depth may be distinguished from the second depth by a viewer's eyes. An interval between the first modulation frame period and the second modulation frame period may be greater than or equal to a minimum recognition time such that the modulation region is recognized as a continuous image by the viewer's eyes.

In example embodiments, the size of the modulation region may be periodically changed on the basis of the modulation reference timing.

In example embodiments, the size of the modulation region at the second modulation frame period may be greater than the size of the modulation region at the first modulation frame period.

In example embodiments, the periodically changing the three-dimensional depth of the modulation region may include gradually changing the modulation distance from an initial distance to a first distance during a time period from a start frame period prior to the modulation reference timing to the modulation reference timing such that the three-dimensional depth of the modulation region has a first depth, and suddenly changing the modulation distance from the first distance to a second distance at an end frame period directly subsequent to the modulation reference timing such that the three-dimensional depth of the modulation region has a second depth.

In example embodiments, the three-dimensional depth of the modulation region may be gradually changed during a time period from the start frame to the modulation reference timing such that the gradual change of the three-dimensional depth is unrecognizable. The three-dimensional depth the modulation region may be suddenly changed at the end frame such that the sudden change of the three-dimensional depth is subliminally recognizable.

In example embodiments, the content image may include a two-dimensional image or a three-dimensional image having the left-eye content image and the right-eye content image.

Another aspect is an image displaying method including displaying a content image, displaying a first three-dimensional insertion image along with the content image at a first modulation frame period prior to periodic modulation reference timing, the first three-dimensional insertion image having a first depth, and displaying a second three-dimensional insertion image along with the content image at a second modulation frame period subsequent to the modulation reference timing, the second three-dimensional insertion image having a second depth different from the first depth.

In example embodiments, a period of the modulation reference timing may be substantially the same as a desired blinking period of eyes.

In example embodiments, an interval between from the first modulation frame period and the second modulation frame period may be greater than or equal to a minimum recognition time such that the first three-dimensional insertion image and the second three-dimensional insertion image are recognized as continuous images by eyes.

In example embodiments, the first three-dimensional insertion image may be substantially the same as the second three-dimensional insertion image.

In example embodiments, the second three-dimensional insertion image may be an enlarged image of the first three-dimensional insertion image.

Another aspect is a display device including an image receiving unit configured to receive image data for a content image, a modulator configured to i) determine a modulation region and a peripheral region in the content image, ii) generate a left-eye content image and a right-eye content image based on the image data for the content image such that the modulation region has a three-dimensional depth, and iii) periodically change the three-dimensional depth of the modulation region by changing a modulation distance between the modulation region in the left-eye content image and the modulation region in the right-eye content image on the basis of periodic modulation reference timing, and a display unit connected to the modulator and configured to display the left-eye content image and the right-eye content image.

In example embodiments, a period of the modulation reference timing may be substantially the same as a desired blinking period of eyes.

In example embodiments, the modulator may include a three-dimension convertor configured to modulate the content image from a two-dimensional image to a three-dimensional image, and a depth adjustor configured to adjust the modulation distance to change the three-dimensional depth of the modulation region.

In example embodiments, the modulator may adjust the modulation distance to a first distance at a first modulation frame period prior to the modulation reference timing such that the three-dimensional depth of the modulation region has a first depth, and adjust the modulation distance to a second distance at a second modulation frame period subsequent to the modulation reference timing such that the three-dimensional depth of the modulation region has a second depth.

In example embodiments, the modulator may gradually change the modulation distance from an initial distance to a first distance during a time period from a start frame period prior to the modulation reference timing to the modulation reference timing such that the three-dimensional depth of the modulation region has a first depth, and suddenly change the modulation distance from the first distance to a second distance at an end frame period directly subsequent to the modulation reference timing such that the three-dimensional depth of the modulation region has a second depth.

Another aspect is a method of displaying an image, comprising receiving image data for a content image; determining a modulation region and a peripheral region in the content image; generating a left-eye content image and a right-eye content image based on the image data for the content image such that the modulation region has a three-dimensional depth; displaying the left-eye content image and the right-eye content image; and periodically changing the three-dimensional depth of the modulation region by changing a modulation distance between the modulation region in the left-eye content image and the modulation region in the right-eye content image based at least in part on a periodic modulation reference timing.

In example embodiments, a period of the modulation reference timing is substantially the same as a desired blinking period of eyes. Periodically changing the three-dimensional depth of the modulation region can comprise changing the three-dimensional depth of the modulation region to have a positive depth such that the modulation region is recognized as closer than the peripheral region and changing the three-dimensional depth of the modulation region to have a negative depth such that the modulation region is recognized farther than the peripheral region. Periodically changing the three-dimensional depth of the modulation region can comprise adjusting the modulation distance to a first distance at a first modulation frame period prior to the modulation reference timing such that the three-dimensional depth of the modulation region has a first depth and adjusting the modulation distance to a second distance at a second modulation frame period subsequent to the modulation reference timing such that the three-dimensional depth of the modulation region has a second depth.

In example embodiments, the difference between the first depth and the second depth is selected so as to be distinguishable by a viewer and an interval between the first modulation frame period and the second modulation frame period is greater than or equal to a minimum recognition time such that the modulation region is recognizable by the viewer. The size of the modulation region can be periodically changed based at least in part on the modulation reference timing. The size of the modulation region at the second modulation frame period can be greater than the size of the modulation region at the first modulation frame period.

In example embodiments, periodically changing the three-dimensional depth of the modulation region comprises gradually changing the modulation distance from an initial distance to a first distance during a time period from a start frame period prior to the modulation reference timing to the modulation reference timing such that the three-dimensional depth of the modulation region has a first depth and suddenly changing the modulation distance from the first distance to a second distance at an end frame period directly subsequent to the modulation reference timing such that the three-dimensional depth of the modulation region has a second depth. The three-dimensional depth of the modulation region can be gradually changed during the time period from the start frame to the modulation reference timing such that the gradual change of the three-dimensional depth is unrecognizable by a viewer and the three-dimensional depth the modulation region can be suddenly changed at the end frame such that the sudden change of the three-dimensional depth is subliminally recognizable by the viewer.

In example embodiments, the content image includes a two-dimensional image or a three-dimensional image having the left-eye content image and the right-eye content image.

Another aspect is an image displaying method, comprising displaying a content image; displaying a first three-dimensional insertion image along with the content image at a first modulation frame period prior to a periodic modulation reference timing, wherein the first three-dimensional insertion image has a first depth; and displaying a second three-dimensional insertion image along with the content image at a second modulation frame period subsequent to the modulation reference timing, wherein the second three-dimensional insertion image has a second depth different from the first depth.

In example embodiments, a period of the modulation reference timing is substantially the same as a desired blinking period of eyes. An interval between from the first modulation frame period and the second modulation frame period can be greater than or equal to a minimum recognition time such that the first three-dimensional insertion image and the second three-dimensional insertion image are recognizable by a viewer. The first three-dimensional insertion image can be substantially the same as the second three-dimensional insertion image. The second three-dimensional insertion image can be an enlarged version of the first three-dimensional insertion image.

Another aspect is a display device, comprising an image receiver configured to receive image data for a content image; a modulator configured to: i) determine a modulation region and a peripheral region in the content image, ii) generate a left-eye content image and a right-eye content image based on the image data for the content image such that the modulation region has a three-dimensional depth, and iii) periodically change the three-dimensional depth of the modulation region by changing a modulation distance between the modulation region in the left-eye content image and the modulation region in the right-eye content image based at least in part on a periodic modulation reference timing; and a display unit connected to the modulator and configured to display the left-eye content image and the right-eye content.

In example embodiments, a period of the modulation reference timing is substantially the same as a desired blinking period of eyes. The modulator can include a three-dimension convertor configured to modulate the content image from a two-dimensional image to a three-dimensional image and a depth adjustor configured to adjust the modulation distance to change the three-dimensional depth of the modulation region. The modulator can be further configured to adjust the modulation distance to a first distance at a first modulation frame period prior to the modulation reference timing such that the three-dimensional depth of the modulation region has a first depth and adjust the modulation distance to a second distance at a second modulation frame period subsequent to the modulation reference timing such that the three-dimensional depth of the modulation region has a second depth.

In example embodiments, the modulator is further configured to gradually change the modulation distance from an initial distance to a first distance during a time period from a start frame period prior to the modulation reference timing to the modulation reference timing such that the three-dimensional depth of the modulation region has a first depth and suddenly change the modulation distance from the first distance to a second distance at an end frame period directly subsequent to the modulation reference timing such that the three-dimensional depth of the modulation region has a second depth.

Therefore, according to at least one embodiment, a method of displaying an image periodically changes a three-dimensional depth of a modulation region in a content image or a three-dimensional depth of a three-dimensional insertion image, thereby inducing blinking of a viewer's eyes. In addition, the method of displaying the image determines the modulation region at which the viewer intensively looks and periodically changes the three-dimensional depth of the modulation region or inserts the three-dimensional insertion image in the insertion region, thereby inducing blinking without distortion of the content image. Thus, when the viewer watches some content for a long time, tired or dry eyes can be reduced and normal eyesight can be maintained.

Further, according to at least one embodiment, a display device periodically changes the three-dimensional depth of the modulation region in the content image or the three-dimensional depth of the three-dimensional insertion image, thereby inducing blinking of viewer's eyes. In addition, although the display device receives the content image including two-dimensional image data, the display device can modulate the content image from two-dimensional image to three-dimensional image or insert the three-dimensional insertion image, thereby inducing blinking of viewer's eyes regardless of type of content image.

BRIEF DESCRIPTION OF THE DRAWINGS

Exemplary embodiments will be described more fully hereinafter with reference to the accompanying drawings, in which various embodiments are shown.

DETAILED DESCRIPTION OF CERTAIN INVENTIVE EMBODIMENTS

Exemplary embodiments will be described more fully hereinafter with reference to the accompanying drawings, in which various embodiments are shown.

Figure 1:
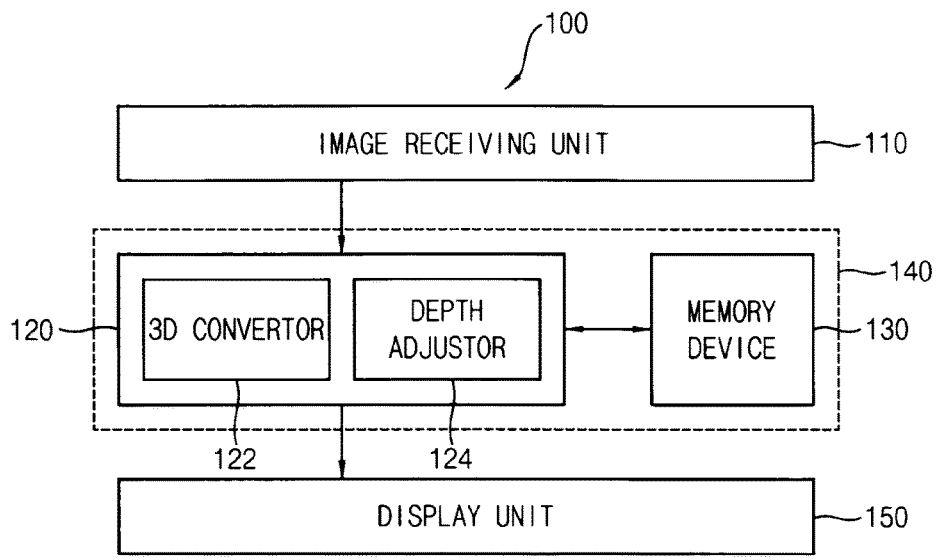
FIG. 1 is a block diagram illustrating a display device according to example embodiments.

FIG. 1 is a block diagram illustrating a display device according to example embodiments.

Referring to FIG. 1, the display device 100 includes an image receiving unit or image receiver 110 receiving image data for content or a content image, a modulator 120 modulating the content image, a memory device or memory 130 connected to the modulator 120, and a display unit or display 150 on which the content image is displayed. The display device 100 may be included in an electronic device capable of processing the content image to display the content image. For example, the display device 100 may be applied to an electronic device such as a television (TV), a mobile phone, a laptop computer, a tablet personal computer (PC), a an electronic book, etc.

The image receiving unit 110 receives image data for a content image. For example, the image receiving unit 110 can receive the content image from a broadcasting station via a broadcasting network or can receive the content image from an internet server via an internet network. Further, the image receiving unit 110 can receive the content image from a storage medium (e.g., solid state drive (SSD), hard disc drive (HDD), compact disc (CD), digital versatile disc (DVD), blue-ray disc, memory stick, universal serial bus (USB) memory, etc.). If the image receiving unit 110 receives the content image from the broadcasting station by the broadcasting network, the image receiving unit 110 may include a broadcasting network adapter. If the image receiving unit 110 receives the content image from the internet server by the internet network, the image receiving unit 110 may include an internet network adapter. If the image receiving unit 110 receives the content image from the storage medium, the image receiving unit 110 may include an interface connected to the storage medium.

The content image may include a still image and/or a moving image. If the content image includes a moving image, the content image may include plurality of frame images that are different from each other at respective frame periods. In one example embodiment, the content image includes a two-dimensional image or a three-dimensional image. For example, the content image may include the three-dimensional image having a left-eye content image and a right-eye content image. The content image may include image data. The image data may include digital signals and/or analog signals for the content image 110. For example, the image data may include a digital signal such as sRGB, scRGB, xvYCC, YCbCr, CIELAB, CIE-XYZ, etc.

The modulator 120 determines a modulation region and a peripheral region in the content image. The modulator 120 generates a left-eye content image and a right-eye content image based on the image data for the content image such that the modulation region has a three-dimensional depth. The modulator 120 can periodically change the three-dimensional depth of the modulation region by changing a modulation distance between the modulation region in the left-eye content image and the modulation region in the right-eye content image based on a periodic modulation reference timing. A three-dimensional depth can refer to a three-dimensional effect of the content image as recognized by the viewer's eyes.

In one example embodiment, the modulation region in the content image may be recognized as closer than the peripheral region in the content image when the three-dimensional depth of the modulation region has a positive depth. Thus, the modulation region in the content image may be recognized as closer than the display unit 150 and may be recognized as a projected image by the viewer's eyes. Also, the modulation region in the content image may be recognized as farther than the peripheral region in the content image when the three-dimensional depth of the modulation region has a negative depth. Thus, the modulation region in the content image may be recognized as farther than the display unit 150 and may be recognized as a recessed image by the viewer's eyes. The three-dimensional depth of the modulation region may be changed by adjusting the left-eye content image recognized through the viewer's left-eye and the right-eye content image recognized through the viewer's right-eye. The three-dimensional depth of the modulation region may be determined by the modulation distance between the modulation region in the left-eye content image and the modulation region in the right-eye content image and a viewing distance between the viewer's eyes and the display unit 150.

When the left-eye content image and the right-eye content image are recognized at different angles from each other, the human brain may overlap the left-eye content image and the right-eye content image, thereby being recognized as a three-dimensional image. In one example embodiment, the modulator 120 may periodically change the three-dimensional depth of the modulation region to subliminally induce blinking of viewer's eyes. Human eyes can be prevented from drying eyes and from eyesight deterioration by blinking. Generally, humans may blink their eyes about 15 times to 20 times per minute. Thus, humans may blink their eyes an average of every 3 to 4 seconds. However, when a viewer watches content for an extended period of time, the viewer's blinking rate may be reduced less than 5 times per minute. When the blinking rate is reduced, the viewer's eyes may become dry and the viewer's eyesight may deteriorate. Therefore, to prevent dry eyes and eyesight deterioration, the modulator 120 can periodically change the three-dimensional depth of the modulation region in the content image based on a periodic modulation reference timing. Accordingly, the viewer may subliminally recognize the change of the three-dimensional depth of the modulation region in the content image and may subliminally blink their eyes in accordance with the predetermined period.

The modulator 120 may include e.g., a micro processing unit (MPU), a central processing unit (CPU), etc. However, the modulator 120 type is not limited thereto. Also, the modulator 120 may include a three-dimension convertor 122 and a depth adjustor 124. The three-dimension convertor 122 can modulate the content image from the two-dimensional image to the three-dimensional image. The depth adjustor 124 can adjust the modulation distance between the modulation region in the left-eye content image and the modulation region in the right-eye content image to change the three-dimensional depth of the modulation region. For example, when the content image includes the two-dimensional image, the three-dimension convertor 122 can modulate the content image to the three-dimensional image. Also, the depth adjustor 124 can change the three-dimensional depth of the modulated content image. In one example embodiment, the modulator 120 can modulate the content data for the content image to change the three-dimensional depth of the content image.

The memory device 130 is connected to the modulator 120. The memory device 130 can store information related to changing the three-dimensional depth of the content image as an algorithm. For example, the memory device 130 may include a non-volatile memory (e.g., erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), etc.), and/or a volatile memory (e.g., dynamic random access memory (DRAM), a static random access memory (SRAM), mobile DRAM, etc.). In one example embodiment, the modulator 120 and the memory device 130 are formed on a graphics card of the display device, an application processor (AP), or a driver integrated circuit (IC) of the display panel. Further, the modulator 120 and the memory device 130 can formed on a field programmable gate array (FPGA) 140 board. The FPGA 140 may be installed on the display device 100.

The display unit 150 is connected to the modulator 120. The three-dimensional image modulated by the modulator 120 can be displayed on the display unit 150. For example, the left-eye content image and the right-eye content image can be respectively displayed on the display unit 150 at predetermined intervals. Accordingly, the viewer can watch the three-dimensional image using shutter glasses having left-eye lens and right-eye lens that are alternatively turned on. In addition, the display unit 150 can separate the left-eye content image and the light-eye content image using optical plates such as a parallax barrier, a switchable barrier, a lenticular lens, switchable lens, etc. In these embodiments, the viewer can watch the three-dimensional image without three-dimension glasses. However, a method of implementing the three-dimensional image is not limited thereto. For example, the three-dimensional image may be implemented by an anaglyph glasses technique or a patterned retarder glasses technique.

Figure 2:
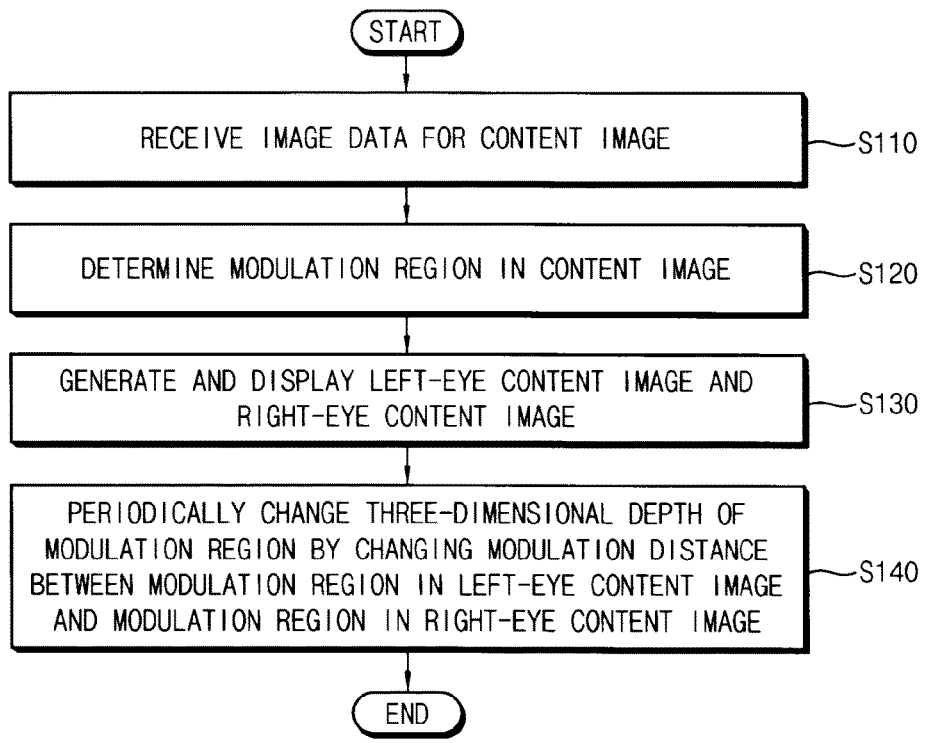
FIG. 2 is a flow chart illustrating a method of displaying an image according to example embodiments.
Figure 3:
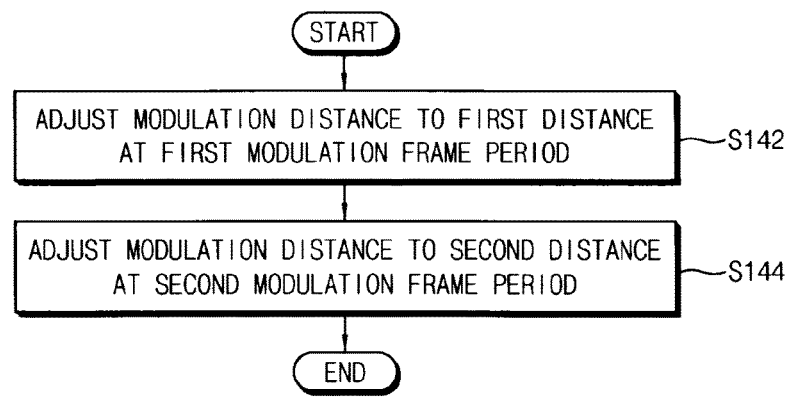
FIG. 3 is a flow chart illustrating one example of periodically changing a three-dimensional depth of a modulation region by the method of displaying an image of FIG. 2.
Figure 4:
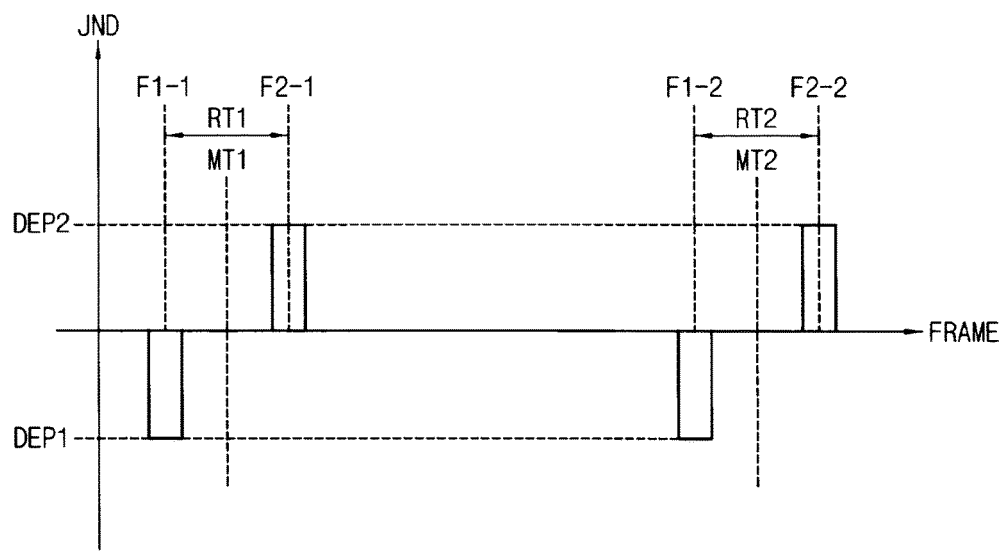
FIG. 4 is a graph illustrating an example of a three-dimensional depth of a modulation region changed by the method of displaying an image of FIG. 3.
Figure 5A:
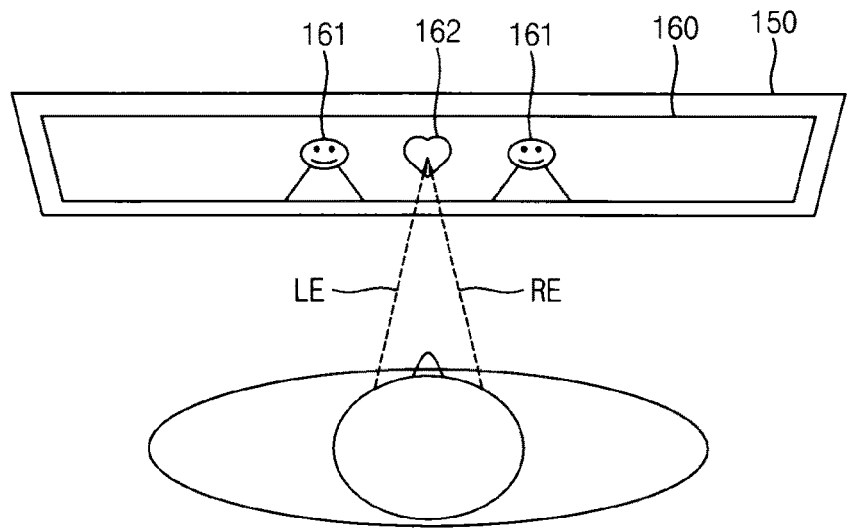
FIGS. 5A through 5C are diagrams illustrating a content image displayed by the method of displaying an image of FIG. 3.
Figure 5B:
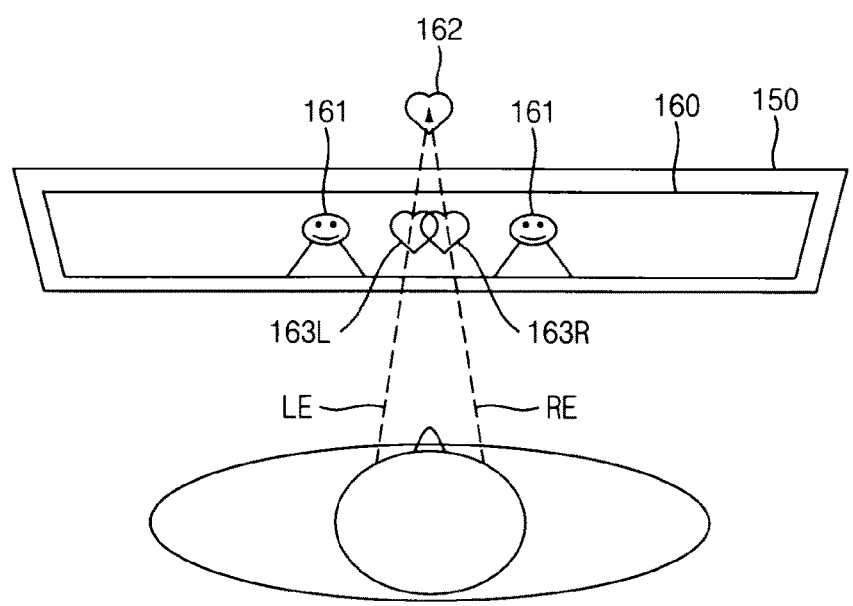
Figure 5C:
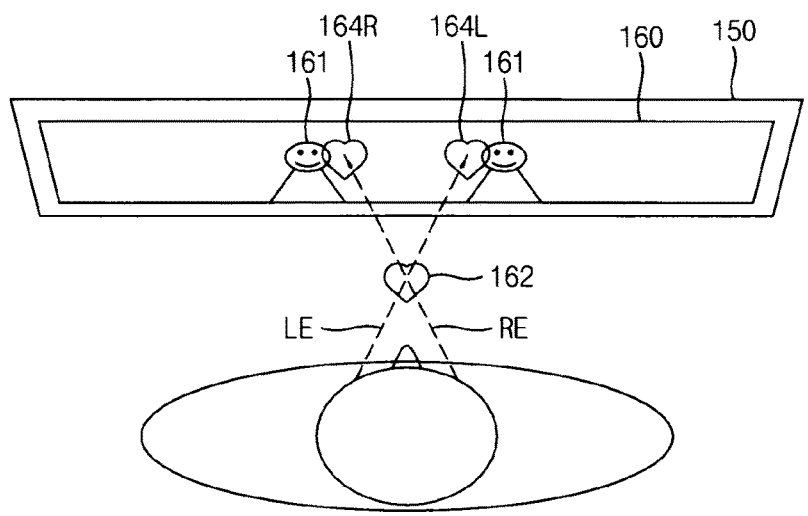

FIG. 2 is a flow chart illustrating a method of displaying an image according to example embodiments. FIG. 3 is a flow chart illustrating one example of periodically changing a three-dimensional depth of a modulation region by the method of displaying an image of FIG. 2. FIG. 4 is a graph illustrating an example of a three-dimensional depth of a modulation region changed by the method of displaying an image of FIG. 3. FIGS. 5A through 5C are diagrams illustrating a content image displayed by the method of displaying an image of FIG. 3.

Referring to FIGS. 2 through 5C, the three-dimensional depth of a modulation region can be periodically changed.

As shown in FIG. 2, the method of FIG. 2 includes receiving image data for a content image (Step S110), determining a modulation region and a peripheral region in the content image (Step S120), and generating a left-eye content image and a right-eye content image based on the image data for the content image such that the modulation region has a three-dimensional depth. The method further includes displaying the left-eye content image and the right-eye content image (Step S130) and periodically changing the three-dimensional depth of the modulation region by changing a modulation distance between the modulation region in the left-eye content image and the modulation region in the right-eye content image on the basis of periodic modulation reference timing (Step S140).

The method of FIG. 2 includes receiving image data for the content image (Step S110). The content image may include a two-dimensional image or a three-dimensional image. The content image may include a still image and/or a moving image. Since the method of FIG. 2 periodically changes the three-dimensional depth of the modulation region, the method of FIG. 2 can display the original content image on the display unit until the three-dimensional depth of the modulation region is changed.

The method of FIG. 2 includes determining a modulation region and a peripheral region in the content image (Step S120). The method of FIG. 2 also includes changing the three-dimensional depth of the modulation region that is a portion of the content image, not the entire content image. The modulation region may be determined by variety of methods. In one example embodiment, when the viewer works using the computer monitor, the viewer may intensively look a portion of the computer monitor. The method of FIG. 2 may determine a region at which the viewer is intensively looking as the modulation region and change the three-dimensional depth of the modulation region. In another example embodiment, when the viewer is working via the use of a mouse device, a portion of the computer monitor which the mouse pointer of the mouse device indicates may be determined as the modulation region. Thus, the method of FIG. 2 may determine the modulation region by detecting the mouse pointer of the mouse device. Also, the method of FIG. 2 may determine the modulation region by detecting the viewer's line of sight using an additional eye detecting unit. In this embodiment, the method of FIG. 2 may change the three-dimensional depth of the modulation region at which the viewer intensively looks, thereby accurately stimulating the viewer's eye.

The method of FIG. 2 includes generating a left-eye content image and a right-eye content image based on the image data for the content image such that the modulation region has a three-dimensional depth and display the left-eye content image and the right-eye content image (Step S130). When the content image includes the two-dimensional image, the method of FIG. 2 includes generating a left-eye content image and a right-eye content image based on the image data for the content image using the three-dimension convertor included in the modulator. Since the generated left-eye content image and right-eye content image have different angles from each other, the modulation region can be recognized as a three-dimensional image by the viewer.

The method of FIG. 2 includes periodically changing the three-dimensional depth of the modulation region by changing the modulation distance between the modulation region in the left-eye content image and the modulation region in the right-eye content image on the basis of a periodic modulation reference timing (Step S140). Thus, the method of FIG. 2 can change the three-dimensional depth of the modulation region with the predetermined period. The three-dimensional depth of the modulation region can be determined by the modulation distance between the modulation region in the left-eye content image and the modulation region in the right-eye content image. The angles of the content image recognized by the viewer's eyes can be changed according to the modulation distance between the modulation region in the left-eye content image and the modulation region in the right-eye content image. Therefore, the three-dimensional depth of the modulation region can be changed according to the modulation distance.

The change of the three-dimensional depth of the modulation region may stimulate the viewer's eyes. Generally, since a human optic nerve does not detect stimulation lower than a threshold, the human optic nerve cannot detect the change of the three-dimensional depth lower than a threshold. However, since the human optic nerve can detect stimulation greater than the threshold, the human optic nerve can detect the change of the three-dimensional depth greater than the threshold. For example, generally, humans cannot detect a change of three-dimensional depth lower than about 3% of a viewing distance. Here, the viewing distance generally refers to the distance between the viewer's eyes and the display unit. Thus, when the change of the three-dimensional depth of the modulation region is lower than about 3% of the viewing distance, the viewer can recognize that the three-dimensional depth of the modulation region is substantially the same as the three-dimensional depth of the peripheral region. However, when the change of the three-dimensional depth of the modulation region is greater than about 3% of the viewing distance, the viewer can distinguish between the three-dimensional depth of the modulation region and the three-dimensional depth of the peripheral region and can recognize a change of the three-dimensional depth of the modulation region.

When the human eyes receive stimulation greater than the threshold, humans can subliminally blink. The method of FIG. 2 may stimulate the viewer's eye by instantly changing the three-dimensional depth of the modulation region such that the viewer subliminally blinks their eyes. The method of FIG. 2 includes periodically changing the three-dimensional depth of the modulation region. In one example embodiment, the period of the modulation reference timing may be substantially the same as a desired blinking period of eyes.

For example, the period of the modulation timing may be the average blinking period of human eyes. The three-dimensional depth of the modulation region may be changed to a period in the range of about 3 seconds to about 4 seconds because the average blinking period of human eyes is about 3 seconds to about 4 seconds.

As shown in FIG. 3, the method of FIG. 2 may include adjusting the modulation distance to a first distance at a first modulation frame period prior to the modulation reference timing such that the three-dimensional depth of the modulation region has a first depth (Step S142) and adjusting the modulation distance to a second distance at a second modulation frame period subsequent to the modulation reference timing such that the three-dimensional depth of the modulation region has a second depth (Step S144).

As shown in FIG. 4, the x-axis represents a frame (i.e., time) FRAME and the y-axis represents the three-dimensional depth level JND of the modulation region. Here, the three-dimensional depth level JND generally refers to the quantitative level of the three-dimensional depth of the modulation region. In one example embodiment, the three-dimensional depth level JND of the modulation region is the ratio of the three-dimensional depth of the modulation region to the viewing distance between the display unit and the viewer's eyes. For example, when the viewing distance is about 100 cm and the modulation region is recognized about 90 cm apart from the viewer's eyes, the three-dimensional depth of the modulation region may be about 10 cm (i.e., 100 cm−90 cm=10 cm). In this embodiment, since the three-dimensional depth of the modulation region is about 10% of the viewing distance (i.e., 10 cm/100 cm*100=10%), the three-dimensional depth level JND of the modulation region is about 10%. When the modulation region is recognized as closer than the peripheral region, the three-dimensional depth level JND of the modulation region has a positive value. On the other hand, when the modulation region is recognized as farther than the peripheral region, the three-dimensional depth level JND of the modulation region has a negative value. In one example embodiment, the three-dimensional depth level JND of the modulation region changes from a first depth DEP1 to a second depth DEP2 on the basis of a modulation reference timing MT1, MT2. The first depth DEP1 may be a negative value and the second depth DEP2 may be a positive value. In this embodiment, the modulation region can be recognized as farther than the peripheral region at the first modulation frame period F1-1, F1-2 and recognized as closer than the peripheral region at the second modulation frame period F2-1, F2-2.

Hereinafter, a method of changing of the three-dimensional depth of the modulation region according to the graph of FIG. 4 will be described in detail with reference to FIGS. 5A through 5C.

As shown in FIG. 5A, the content image 160 is displayed on the display unit 150 in a certain frame period. When the content image 160 includes a two-dimensional image, the modulation region 162 and the peripheral region 161 may have the same three-dimensional depth.

As shown in FIG. 5B, the modulation region 162 having the first depth DEP1 is display on the display unit 150 at the first modulation frame period F1-1, F1-2 prior to the modulation reference timing MT1, MT2. For example, the modulation region 162 may have a negative depth. Accordingly, the modulation region 162 can be recognized as farther than the peripheral region 161. The method of FIG. 2 includes adjusting the modulation distance between the modulation region in the first left-eye content image 163L and the modulation region in the first right-eye content image 163R to the first distance at the first modulation frame period F1-1, F1-2. Since the peripheral region in the first left-eye content image is substantially the same as the peripheral region in the first right-eye content image, the peripheral region 161 can be recognized as on the same plane as the display unit 150 by the viewer's left-eye LE and right eye RE. However, since the modulation region in the first left-eye content image 163L is different from the modulation region in the first right-eye content image 163R, the modulation region 162 can be recognized as farther than the display unit 150 by the viewer's left-eye LE and right eye RE.

As shown in FIG. 5C, the modulation region 162 having the second depth DEP2 is displayed on the display unit 150 at the second modulation frame period F2-1, F2-2 subsequent to the modulation reference timing MT1, MT2. For example, the modulation region 162 may have a positive depth. Accordingly, the modulation region 162 can be recognized as closer than the peripheral region 161. The method of FIG. 2 includes adjusting the modulation distance between the modulation region in the second left-eye content image 164L and the modulation region in the second right-eye content image 164R to the second distance at the second modulation frame period F2-1, F2-2. Since the peripheral region in the second left-eye content image is substantially the same as the peripheral region in the second right-eye content image, the peripheral region 161 can be recognized as on the same plane as the display unit 150 by the viewer's left-eye LE and right eye RE. However, since the modulation region in the second left-eye content image 164L is different from the modulation region in the second left-eye content image 164R, the modulation region 162 can be recognized closer than the display unit 150 by the viewer's left-eye LE and right eye RE.

Since the modulation region 162 can be recognized as farther than the peripheral region 161 at the first modulation frame period F1-1, F1-2 and recognized as closer than the peripheral region 161 at the second modulation frame period F2-1, F2-2, the viewer can recognize that the modulation region 162 is suddenly coming out from the display unit 150. Thus, since the human eyes recognizes two frame images displayed in short interval as a continuous image, the modulation region 162 at the first modulation frame period F1-1, F1-2 and the modulation region 162 at the second modulation frame period F2-1, F2-2 can be recognized as a continuous image by the viewer's eyes.

In one example embodiment, an interval RT1, RT2 between from the first modulation frame period F1-1, F1-2 and the second modulation frame period F2-1, F2-2 is longer than or equal to a minimum recognition time. Thus, the method of FIG. 2 includes displaying the modulation region in the first left-eye content image 163L and the modulation region in the first right-eye content image 163R on the display unit 150 at the first modulation frame period F1-1, F1-2. Also, the method of FIG. 2 includes displaying the modulation region in the second left-eye content image 164L and the modulation region in the second right-eye content image 164R on the display unit 150 at the second modulation frame period F2-1, F2-2 having the interval RT1, RT2 longer than or equal to the minimum recognition time from the first modulation frame period F1-1, F1-2. The minimum recognition time generally refers to a minimum time for recognizing two images as a continuous image by the viewer's eyes. If the interval RT1, RT2 between from the first modulation frame period F1-1, F1-2 and the second modulation frame period F2-1, F2-2 is less than the minimum recognition time, the viewer cannot distinguish the second image at the second modulation frame period F2-1, F2-2 from the first image at the first modulation frame period F1-1, F1-2. Accordingly, the first image at the first modulation frame period F1-1, F1-2 and the second image at the second modulation frame period F2-1, F2-2 may be recognized as an overlapped image by the viewer's eyes.

In one example embodiment, the first depth DEP1 and the second depth DEP2 can be distinguished by human eyes. Because human eyes can only detect stimulation greater than the threshold, the three-dimensional depth of the modulation region can be changed to be detected by human eyes. If the change of the three-dimensional depth is insignificant and cannot be detected by the viewer's eyes, the change of the three-dimensional depth may not stimulate the viewer's eyes and may not induce blinking of viewer's eyes. Therefore, the difference between the first depth DEP1 and the second depth DEP2 is larger than or equal to the predetermined threshold value.

In one example embodiment, to prevent distortion of the content image 160, the modulation region in the first left-eye content image 163L, the modulation region in the first right-eye content image 163R, the modulation region in the second left-eye content image 164L, and the modulation region in the second right-eye content image 164R are displayed on the display unit 150 for a short time. For example, the modulation region in the first left-eye content image 163L and the modulation region in the first right-eye content image 163R are displayed at the first modulation frame period F1-1, F1-2. Also, the modulation region in the second left-eye content image 164L and the modulation region in the second right-eye content image 164R are displayed at the second modulation frame period F2-1, F2-2. Thus, since the three-dimensional depth of the modulation region 162 is changed over a short period of time, the viewer can view the original content image 160 again after blinking their eyes.

In one example embodiment, the modulation reference timing MT1, MT2 is repeated after the predetermined period. In one example embodiment, the period of the modulation reference timing MT1, MT2 is substantially the same as a desired blinking period of eyes. For example, a period of the modulation timing MT1, MT2 may be the average blinking period of human eyes (e.g., about 4 seconds).

In one example embodiment, the scale or size of the modulation region 162 is periodically changed on the basis of the modulation reference timing MT1, MT2. In one example embodiment, the scale of the modulation region 162 at the second modulation frame period F2-1, F2-2 is larger than the scale of the modulation region 162 at the first modulation frame period F1-1, F1-2. Thus, the method of FIG. 2 can change the scale of the modulation region 162 along with the change of the three-dimensional depth of the modulation region 162. For example, the scale of the modulation region 162 has a first area at the first modulation frame period F1-1, F1-2 and the modulation region 162 is recognized as farther than the peripheral region 161. On the other hand, the scale of the modulation region 162 has a second area larger than the first area at the second modulation frame period F2-1, F2-2 and the modulation region 162 is recognized as closer than the peripheral region 161. In this embodiment, the viewer can recognize that the modulation region 162 is suddenly coming out from the display unit 150. In addition, the viewer can recognize that the three-dimensional depth of the modulation region 162 is relatively large because the scale of the modulation region 162 is increased. Therefore, the method of FIG. 2 can apply a relatively large stimulation to the viewer.

Figure 6:
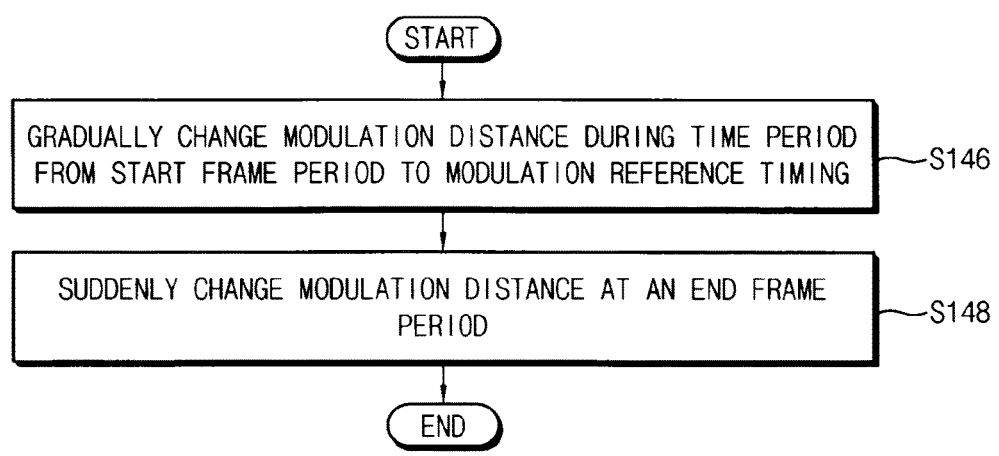
FIG. 6 is a flow chart illustrating another example of periodically changing a three-dimensional depth of a modulation region by the method of displaying an image of FIG. 2.
Figure 7:
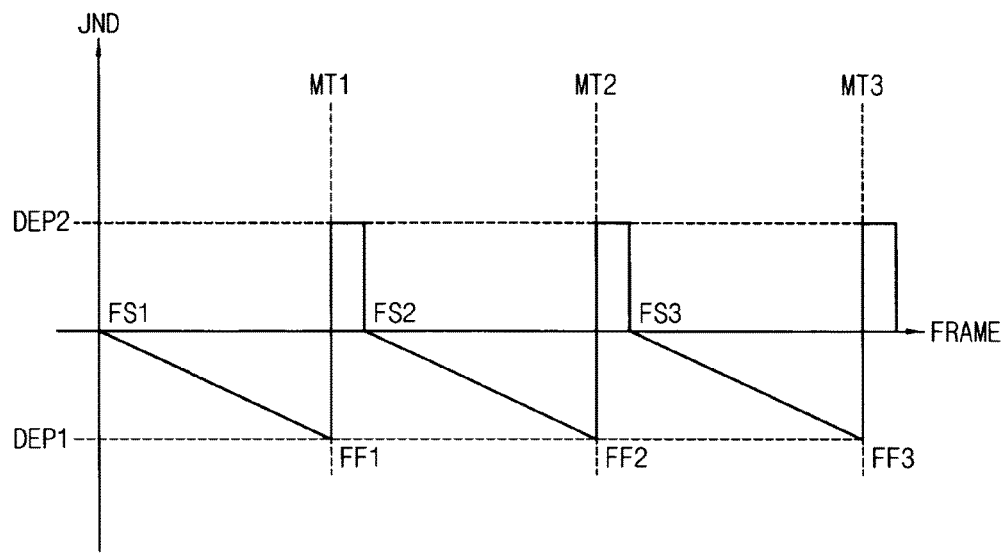
FIG. 7 is a graph illustrating one example of a three-dimensional depth of a modulation region changed by the method of displaying an image of FIG. 6.

FIG. 6 is a flow chart illustrating another example of periodically changing a three-dimensional depth of a modulation region by the method of displaying an image of FIG. 2. FIG. 7 is a graph illustrating one example of a three-dimensional depth of a modulation region changed by the method of displaying an image of FIG. 6. FIGS. 8A through 8D are diagrams illustrating a content image displayed by the method of displaying an image of FIG. 6. FIG. 9 is a graph illustrating another example of a three-dimensional depth of a modulation region changed by the method of displaying an image of FIG. 6.

Referring to FIGS. 6 through 9, the method of FIG. 2 includes gradually changing the modulation distance from an initial distance to a first distance during a time period from a start frame period prior to the modulation reference timing to the modulation reference timing such that the three-dimensional depth of the modulation region has a first depth (Step S146) and suddenly changing the modulation distance from the first distance to a second distance at an end frame period directly subsequent to the modulation reference timing such that the three-dimensional depth of the modulation region has a second depth (Step S148).

As shown in FIG. 7, the method of FIG. 2 includes changing the three-dimensional depth of the modulation region. The method of FIG. 2 includes gradually changing a three-dimensional depth level JND of the modulation region to a first depth DEP1 during a time period from a first start frame period FS1 to a first modulation reference timing MT1. Because the human eyes can detect a stimulation greater than the threshold, the gradual change of the three-dimensional depth level JND of the modulation region may not be detected by the viewer's eyes.

Figure 8A:
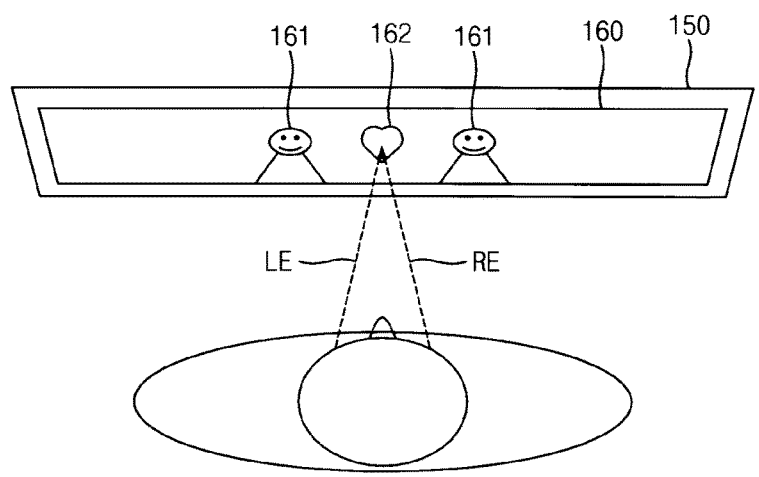
FIGS. 8A through 8E are diagrams illustrating a content image displayed by the method of displaying an image of FIG. 6.
Figure 9:
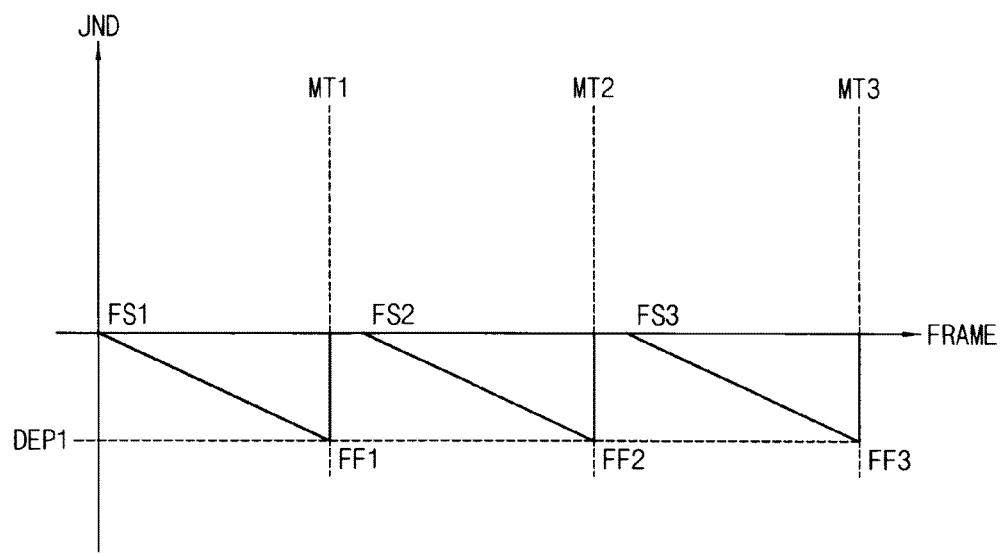
FIG. 9 is a graph illustrating another example of a three-dimensional depth of a modulation region changed by the method of displaying an image of FIG. 6.

As shown in FIG. 8A, the three-dimensional depth level JND of the modulation region 162 at the first start frame period FS1 can be a zero level and the three-dimensional depth of the modulation region 162 can be the same as the three-dimensional depth of the peripheral region 161.

Figure 8B:
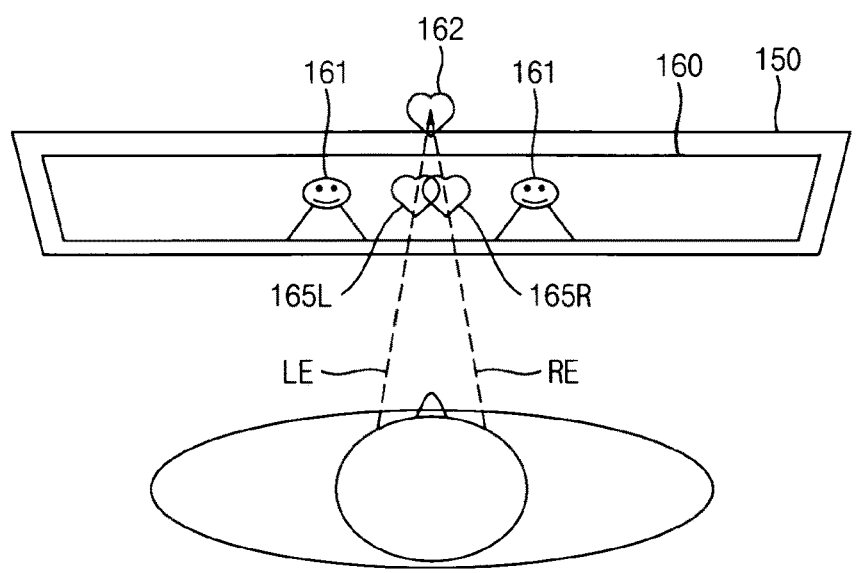

As shown in FIG. 8B, the three-dimensional depth level JND of the modulation region 162 can be slightly decreased and the three-dimensional depth of the modulation region 162 can be lower than the three-dimensional depth of the peripheral region 161. Thus, the modulation region 162 can be recognized as farther than the peripheral region 161 by the modulation region in the first left-eye content image 165L and the modulation region in the first right-eye content image 165R. However, because the changed three-dimensional depth of the modulation region 162 is insignificant, the viewer cannot recognize the change of the three-dimensional depth of the modulation region 162.

Figure 8C:
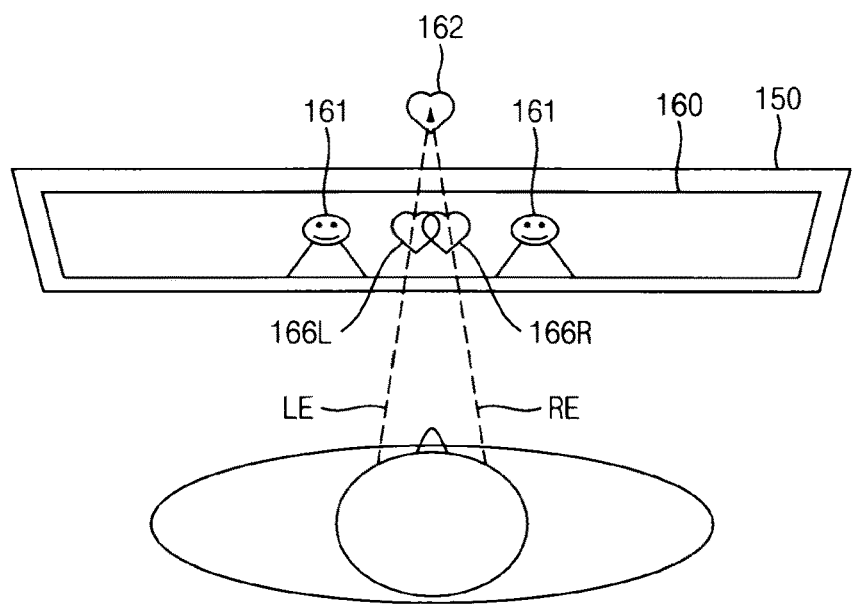

As shown in FIG. 8C, the three-dimensional depth level JND of the modulation region 162 can be decreased farther than the three-dimensional depth level JND of FIG. 8B. The modulation region in the second left-eye content image 166L and the modulation region in the second right-eye content image 166R can be displayed on the display unit 150. A second modulation distance between the modulation region in the second left-eye content image 166L and the modulation region in the second right-eye content image 166R is longer than a first modulation distance between the modulation region in the first left-eye content image 165L and the modulation region in the first right-eye content image 165R. The modulation region 162 can be recognized as farther than the peripheral region 161. However, the viewer can recognize that the three-dimensional depth of the modulation region 162 of FIG. 8C is substantially the same as the three-dimensional depth of the modulation region 162 of FIG. 8B.

Figure 8D:
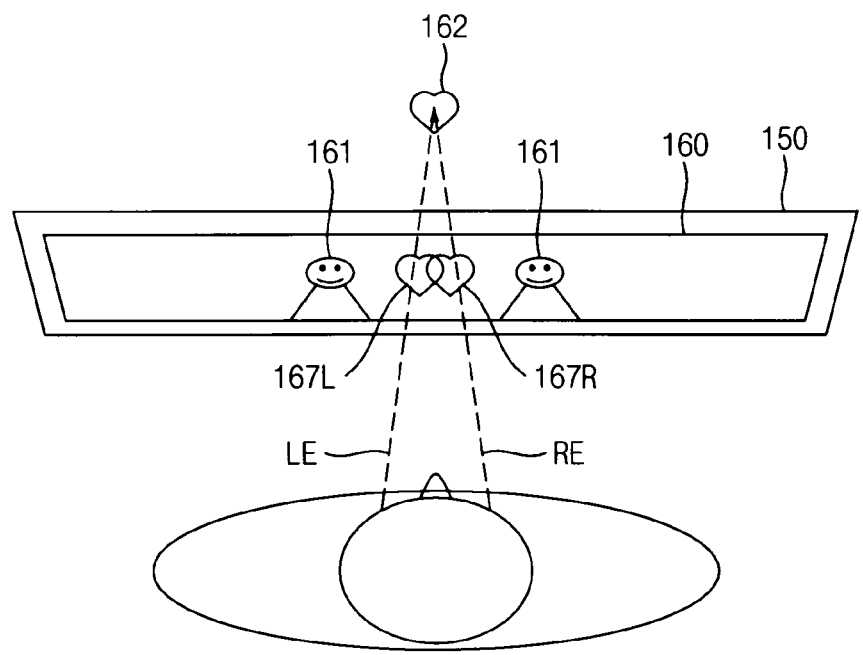

As shown in FIG. 8D, the three-dimensional depth level JND of the modulation region 162 can be decreased farther than the three-dimensional depth level JND of FIG. 8C. The modulation region in the third left-eye content image 167L and the modulation region in the third right-eye content image 167R can be displayed on the display unit 150. A third modulation distance between the modulation region in the third left-eye content image 167L and the modulation region in the third right-eye content image 167R is greater than the second modulation distance between the modulation region in the second left-eye content image 166L and the modulation region in the second right-eye content image 166R. The modulation region 162 can be recognized as farther than the peripheral region 161. However, the viewer can recognize that the three-dimensional depth of the modulation region 162 of FIG. 8D is substantially the same as the three-dimensional depth of the modulation region 162 of FIG. 8C. As a result, the modulation region 162 is gradually moved farther apart from the display unit 150 during a time period from the first start frame period FS1 to the first modulation reference timing MT1. However, the viewer cannot recognize the change of the three-dimensional depth of the modulation region 162 because the three-dimensional depth is gradually changed.

Figure 8E:
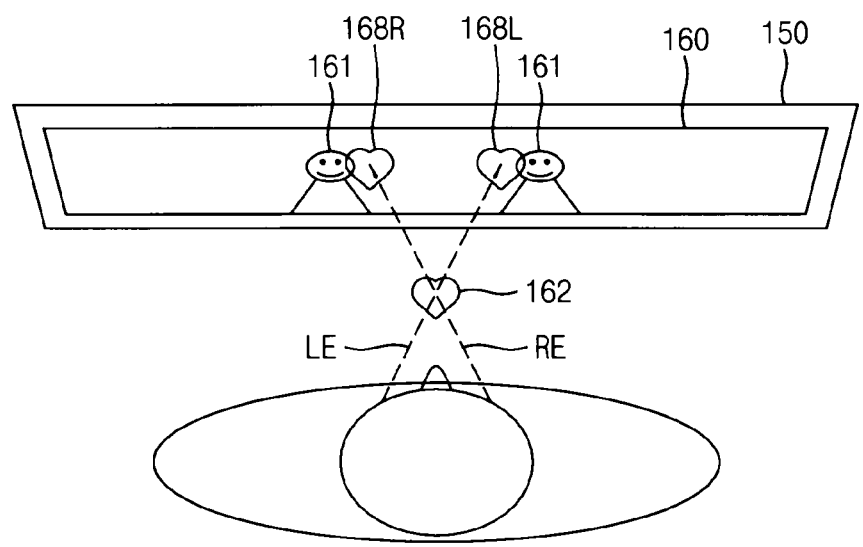

As shown in FIG. 8E, the three-dimensional depth level JND of the modulation region 162 is suddenly changed from the first depth DEP1 to the second depth DEP2 at the first end frame period FF1 directly subsequent to the modulation reference timing MT1. For example, the second depth DEP2 has a positive depth. The modulation region in the fourth left-eye content image 168L can be displayed on the right side and the modulation region in the fourth right-eye content image 168R can be displayed on the left side. The modulation region 162 can be recognized as closer than the peripheral region 161 by the modulation region in the fourth left-eye content image 168L and the modulation region in the fourth right-eye content image 168R. Therefore, the viewer can recognize that the modulation region 162 is suddenly coming out from the display unit 150 at the first end frame period FF1. Therefore, the viewer may subliminally blink their eyes at the first end frame period FF1.

After the first end frame period FF1, the three-dimensional depth level JND of the modulation region 162 can be changed by substantially the same method described above during a time period from a second start frame period FS2 to a second modulation reference timing MT2. In addition, after a second end frame period FF2, the three-dimensional depth level JND of the modulation region 162 can be changed by substantially the same method described above during a time period from a third start frame period FS3 to a third modulation reference timing MT3. The interval between the second modulation reference timing MT2 and the third modulation reference timing MT3 can be a predetermined value. For example, the third modulation reference timing MT3 is separated from the second modulation reference timing MT2 by about 3 seconds to about 4 seconds. Therefore, the viewer may subliminally blink their eyes about every 3 seconds or 4 seconds.

As shown in FIG. 9, the method of FIG. 2 can include changing the three-dimensional depth of the modulation region. The method of FIG. 2 can includes gradually changing a three-dimensional depth level JND of the modulation region to a first depth DEP1 during a time period from a first start frame period FS1 to a first modulation reference timing MT1. The gradual change of the three-dimensional depth level JND of the modulation region may not be detected by the viewer's eyes. The three-dimensional depth level JND of the modulation region can be suddenly changed from the first depth DEP1 to the zero level at a first end frame period FF1 directly subsequent to the modulation reference timing MT1. The viewer may subliminally blink their eyes at the first end frame period FF1. Thus, the three-dimensional depth level JND of the modulation region can be suddenly changed at the first end frame period FF1.

Since the distance between the first depth DEP1 and the zero level is relatively large, the change of the three-dimensional depth of the modulation region can be recognized by the viewer's eye over a relatively short period of time. After the first end frame period FF1, the three-dimensional depth level JND of the modulation region can be changed by substantially the same method as described above during a time period from a second start frame period FS2 to a second modulation reference timing MT2. In addition, after a second end frame period FF2, the three-dimensional depth level JND of the modulation region 162 can be changed by substantially the same method described above during a time period from a third start frame period FS3 to a third modulation reference timing MT3. The interval between the second modulation reference timing MT2 and the third modulation reference timing MT3 can be a predetermined value. For example, the third modulation reference timing MT3 can be separated from the second modulation reference timing MT2 by about 3 seconds to about 4 seconds. Therefore, the viewer may subliminally blink their eyes about every 3 seconds or 4 seconds.

In one example embodiment, the method of FIG. 2 is stored as an algorithm in a memory device. The modulator can change the three-dimensional depth of the modulation region based on the algorithm read from the memory device. In another example embodiment, the method of FIG. 2 is stored in a storage medium. In this embodiment, the modulator can change the three-dimensional depth of the modulation region based on the algorithm read from the storage medium. For example, the storage medium may include solid state drive (SSD), a hard disc drive (HDD), a compact disc (CD), a digital versatile disc (DVD), a blue-ray disc, a memory stick, a universal serial bus (USB) memory, etc.

The display device can periodically change the three-dimensional depth of the content image by performing the method of FIG. 2, thereby inducing blinking of viewer's eyes. In addition, the display device can determine the modulation region at which the viewer intensively looks and change the three-dimensional depth of the modulation region, thereby efficiently inducing blinking of viewer's eyes and minimizing a distortion of the content image. Therefore, although the viewer watches content for an extended period of time, the viewer's eyes can be prevented from becoming tired, effectively preventing the user's eyes from drying and from deteriorating.

Figure 10:
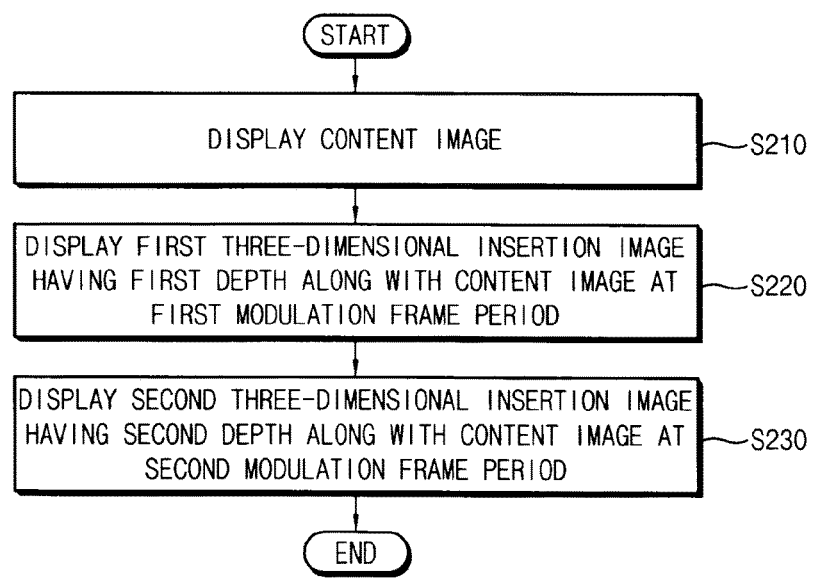
FIG. 10 is a flow chart illustrating a method of displaying an image according to example embodiments.
Figure 11A:
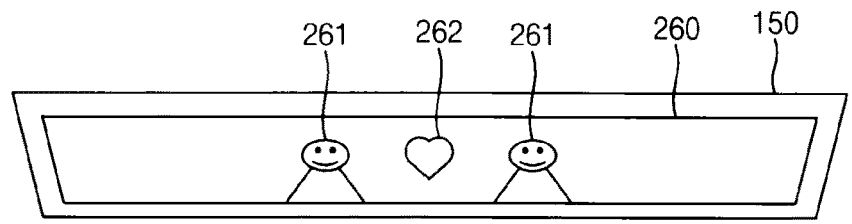
FIGS. 11A through 11C are diagrams illustrating a content image and an insertion image displayed by the method of displaying an image of FIG. 10.
Figure 11A:
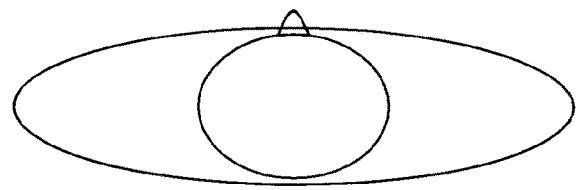
Figure 11B:
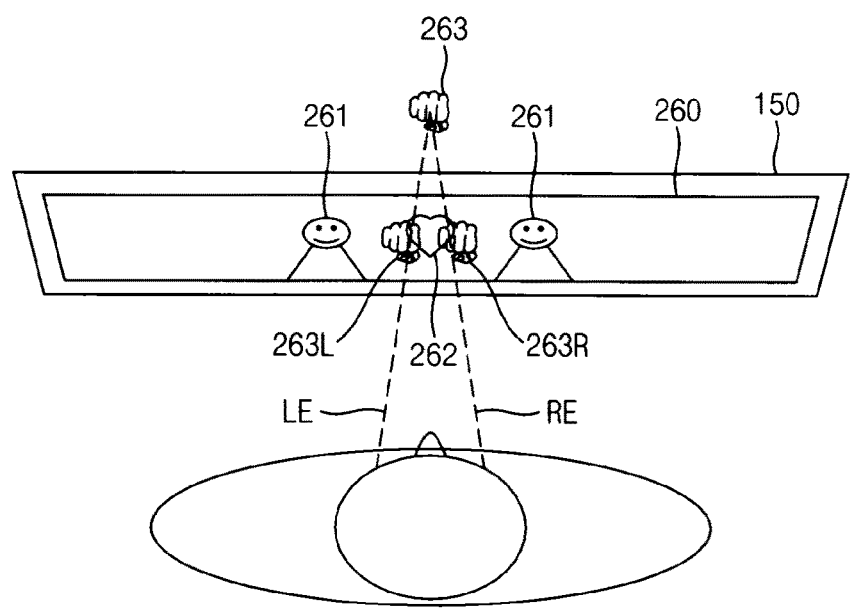
Figure 11C:
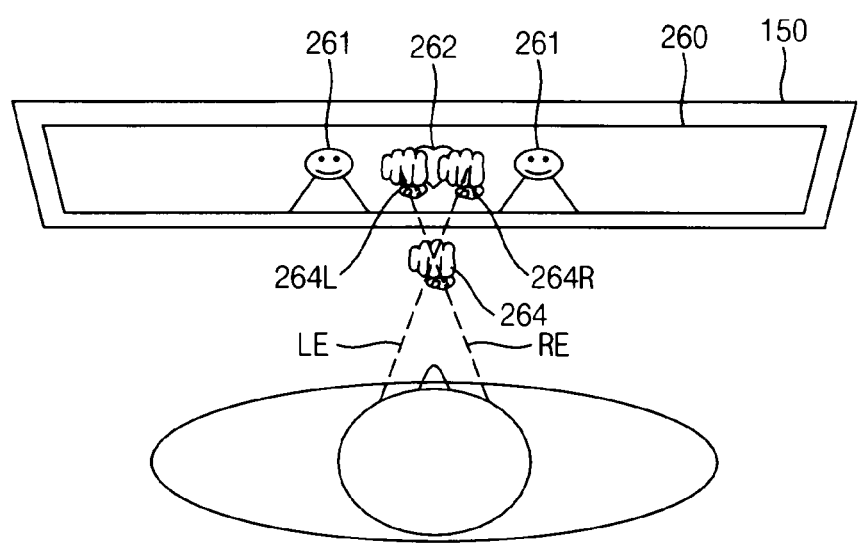

FIG. 10 is a flow chart illustrating a method of displaying an image according to example embodiments. FIGS. 11A through 11C are diagrams illustrating a content image and an insertion image displayed by the method of displaying an image of FIG. 10.

Referring to FIGS. 10 through 11C, the method of FIG. 10 includes inserting additional three-dimensional insertion images to the content image. This is in contrast to the method of FIG. 2 which includes directly changing the three-dimensional depth of the content image.

As shown in FIG. 10, the method of displaying an image of FIG. 10 includes displaying a content image (Step S210) and displaying a first three-dimensional insertion image along with the content image at a first modulation frame period prior to periodic modulation reference timing (Step S220). The first three-dimensional insertion image has a first depth. The method further includes displaying a second three-dimensional insertion image along with the content image at a second modulation frame period subsequent to the modulation reference timing (Step S230), the second three-dimensional insertion image having a second depth different from the first depth.

As shown in FIG. 11A, the method of FIG. 10 includes displaying the content image in certain frame period. The content image may include a two-dimensional image or a three-dimensional image. The content image may include a still image and/or a moving image.

As shown in FIG. 11B, the method of FIG. 10 includes displaying the first three-dimensional insertion image 263 having the first depth along with the content image at a first modulation frame period prior to periodic modulation reference timing. The type of the first three-dimensional insertion image 263 is not limited thereto. Thus, the first three-dimensional insertion image 263 may include a variety of images capable of stimulating the viewer's eyes. The method of FIG. 10 includes changing the three-dimensional depth of the three-dimensional insertion image 263, 264 to stimulate the viewer's eyes. Therefore, the three-dimensional image can be used as the three-dimensional insertion image 263, 264. In one example embodiment, the first three-dimensional insertion image 263 is display in an insertion region 262. The method of FIG. 10 includes determining the insertion region 262 in the content image. For example, the method of FIG. 10 can determine a region at which the viewer intensively looks as the insertion region 262. In this embodiment, the viewer's eyes can be efficiently stimulated, thereby inducing blinking of viewer's eyes. The first three-dimensional insertion image 263 includes the insertion region in the first left-eye content image 263L and the insertion region in the first right-eye content image 263R such that the first three-dimensional insertion image 263 has the first depth. A modulation distance between the insertion region in the first left-eye content image 263L and the insertion region in the first right-eye content image 263R can be a first distance. When the viewer's left-eye LE recognize the insertion region in the first left-eye content image 263L and the viewer's right-eye RE recognize the insertion region in the first right-eye content image 263R, the first three-dimensional insertion image 263 can be recognized as the first depth. For example, the first depth may have a negative value. In this embodiment, the first three-dimensional insertion image 263 can be recognized as farther than the display unit.

As shown in FIG. 11C, the method of FIG. 10 includes displaying the second three-dimensional insertion image having the second depth along with the content image at the second modulation frame period subsequent to the modulation reference timing. In one example embodiment, the first three-dimensional insertion image 263 is substantially the same as the second three-dimensional insertion image 264. In another example embodiment, the second three-dimensional insertion image 264 is an enlarged image of the first three-dimensional insertion image 263. In this embodiment, the viewer can recognize a significant change of the three-dimensional depth of the three-dimensional insertion image 263, 264.

In one example embodiment, the second three-dimensional insertion image 264 is displayed corresponding to the insertion region 262. The insertion region 262 can be a region at which the viewer intensively looks. In this embodiment, the viewer's eyes can be efficiently stimulated, thereby inducing blinking of viewer's eyes. The second three-dimensional insertion image 264 can include a three-dimensional image having the second depth. The second three-dimensional insertion image 264 can include the insertion region in the second left-eye content image 264L and the insertion region in the second right-eye content image 264R such that the second three-dimensional insertion image 264 has the second depth. The modulation distance between the insertion region in the second left-eye content image 264L and the insertion region in the second right-eye content image 264R is a second distance. When the viewer's left-eye LE recognizes the insertion region in the second left-eye content image 264L and the viewer's right-eye RE recognizes the insertion region in the second right-eye content image 264R, the second three-dimensional insertion image 264 is recognized as at the second depth. For example, the second depth may be a positive value. In this embodiment, the first three-dimensional insertion image 263 is recognized as closer than the display unit.

The first three-dimensional insertion image 263 having the first depth is displayed at the first modulation frame period and the second three-dimensional insertion image 264 having the second depth is displayed at the second modulation frame period. Accordingly, the viewer can recognize that the three-dimensional insertion image 263, 264 is a moving image. Thus, since the human eyes recognizes two frame images that are displayed in a short interval as a continuous image, the first three-dimensional insertion image 263 at the first modulation frame period and the second three-dimensional insertion image 264 at the second modulation frame period can be recognized as continuous moving image by the viewer's eyes. For example, as shown in FIGS. 11A through 11C, the viewer can recognize that the three-dimensional insertion image 263, 264 is coming out from behind the display unit 150. The interval between from the first modulation frame period and the second modulation frame period is longer than or equal to a minimum recognition time such that the first three-dimensional insertion image 263 and the second three-dimensional insertion image 264 are recognized as continuous images by the viewer's eyes. The minimum recognition time generally refers to a minimum time for recognizing two images as a continuous image by the eyes. When the interval between from the first modulation frame period and the second modulation frame period is less than the minimum recognition time, the viewer cannot distinguish the second three-dimensional insertion image 264 from the first three-dimensional insertion image 263. Accordingly, the first three-dimensional insertion image 263 and the second three-dimensional insertion image 264 can be recognized as an overlapped image by the viewer's eyes.

In one example embodiment, the first depth DEP1 and the second depth DEP2 can be distinguished by the human eyes. Since they can only detect stimulation greater than the threshold, a change of the three-dimensional depth of the three-dimensional insertion image is changed so as to be detected by human eyes. When the change of the three-dimensional depth is insignificant and cannot be detected by the viewer's eyes, the change of the three-dimensional depth may not stimulate the viewer's eyes and may not induce blinking of the viewer's eyes. Therefore, the difference between the first depth DEP1 and the second depth DEP2 is larger than or equal to the predetermined threshold value.

In one example embodiment, the first three-dimensional insertion image 263 and the second three-dimensional insertion image 264 are displayed on the display unit 150 for a short time. For example, the first three-dimensional insertion image 263 can be displayed at the first modulation frame period. Also, the second three-dimensional insertion image 264 can be displayed at the second modulation frame period. In this embodiment, since the three-dimensional insertion image 263, 264 is respectively displayed in one frame period, the viewer can watch the original content image 160 again after blinking their eyes.

In one example embodiment, the modulation reference timing is repeated by the predetermined period. In one example embodiment, the period of the modulation reference timing is substantially the same as a desired blinking period of eyes. For example, the period of the modulation timing can be the average blinking period of the human eyes (e.g., 4 seconds).

In one example embodiment, the method of FIG. 10 is stored as an algorithm in a memory device. The modulator can change the three-dimensional depth of the three-dimensional insertion image 263, 264 based on the algorithm read from the memory device. In another example embodiment, the method of FIG. 10 is stored in a storage medium. In this embodiment, the modulator can change the three-dimensional depth of the three-dimensional insertion image 263, 264 based on the algorithm read from the storage medium. For example, the storage medium can include a solid state drive (SSD), a hard disc drive (HDD), a compact disc (CD), a digital versatile disc (DVD), a blue-ray disc, a memory stick, a universal serial bus (USB) memory, etc.

The method of FIG. 10 can periodically change the three-dimensional depth of the three-dimensional insertion image 263, 264, thereby inducing blinking of a viewer's eyes. In addition, the method of FIG. 10 can determine the insertion region 262 at which the viewer is intensively looking and display the three-dimensional insertion image 263, 264 on the insertion region 262 in a relatively short period of time, thereby efficiently inducing blinking of the viewer's eyes and minimizing distortion of the content image. Therefore, although the viewer watches content for an extended period of time, the viewer's eyes can be prevented from becoming tired, thereby effectively preventing the viewer's eyes from drying and the viewer's eyesight from deteriorating.

The described technology can be applied to an electronic device having the display device. For example, the described technology can be applied to a cellular phone, a smart phone, a smart pad, a personal digital assistant (PDA), etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the inventive technology. Accordingly, all such modifications are intended to be included within the scope of the invention as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of displaying an image, comprising:
   receiving image data for a content image;
   determining a modulation region and a peripheral region in the content image based on at least one of a first position derived from a mouse device and a second position derived from an eye detecting device;
   generating a left-eye content image and a right-eye content image based on the image data for the content image such that the modulation region has a three-dimensional depth;
   displaying the left-eye content image and the right-eye content image; and
   periodically changing the three-dimensional depth of the modulation region by changing a modulation distance between the modulation region in the left-eye content image and the modulation region in the right-eye content image based at least in part on a periodic modulation reference timing.

2. The method of claim 1, wherein a period of the modulation reference timing is substantially the same as a desired blinking period of eyes.

3. The method of claim 1, wherein periodically changing the three-dimensional depth of the modulation region comprises:
   changing the three-dimensional depth of the modulation region to have a positive depth such that the modulation region is recognized as closer than the peripheral region; and
   changing the three-dimensional depth of the modulation region to have a negative depth such that the modulation region is recognized farther than the peripheral region.

4. The method of claim 1, wherein periodically changing the three-dimensional depth of the modulation region comprises:
   adjusting the modulation distance to a first distance at a first modulation frame period prior to the modulation reference timing such that the three-dimensional depth of the modulation region has a first depth; and
   adjusting the modulation distance to a second distance at a second modulation frame period subsequent to the modulation reference timing such that the three-dimensional depth of the modulation region has a second depth.

5. The method of claim 4, wherein the difference between the first depth and the second depth is selected so as to be distinguishable by a viewer and wherein an interval between the first modulation frame period and the second modulation frame period is greater than or equal to a minimum recognition time such that the modulation region is recognizable by the viewer.

6. The method of claim 4, wherein the size of the modulation region is periodically changed based at least in part on the modulation reference timing.

7. The method of claim 6, wherein the size of the modulation region at the second modulation frame period is greater than the size of the modulation region at the first modulation frame period.

8. The method of claim 1, wherein periodically changing the three-dimensional depth of the modulation region comprises:
   gradually changing the modulation distance from an initial distance to a first distance during a time period from a start frame period prior to the modulation reference timing to the modulation reference timing such that the three-dimensional depth of the modulation region has a first depth; and
   suddenly changing the modulation distance from the first distance to a second distance at an end frame period directly subsequent to the modulation reference timing such that the three-dimensional depth of the modulation region has a second depth.

9. The method of claim 8, wherein the three-dimensional depth of the modulation region is gradually changed during the time period from the start frame to the modulation reference timing such that the gradual change of the three-dimensional depth is unrecognizable by a viewer and wherein the three-dimensional depth the modulation region is suddenly changed at the end frame such that the sudden change of the three-dimensional depth is subliminally recognizable by the viewer.

10. The method of claim 1, wherein the content image includes a two-dimensional image or a three-dimensional image having the left-eye content image and the right-eye content image.

11. An image displaying method, comprising:
receiving a content image for displaying of the content image;
inserting a first three-dimensional insertion image into the content image for displaying the first three-dimensional insertion image along with the content image at a first modulation frame period prior to a periodic modulation reference timing, wherein the first three-dimensional insertion image has a first depth; and
inserting a second three-dimensional insertion image into the content image for displaying the second three-dimensional insertion image along with the content image at a second modulation frame period subsequent to the modulation reference timing, wherein the second three-dimensional insertion image has a second depth different from the first depth.

12. The method of claim 11, wherein a period of the modulation reference timing is substantially the same as a desired blinking period of eyes.

13. The method of claim 11, wherein an interval between from the first modulation frame period and the second modulation frame period is greater than or equal to a minimum recognition time such that the first three-dimensional insertion image and the second three-dimensional insertion image are recognizable by a viewer.

14. The method of claim 11, wherein the first three-dimensional insertion image is substantially the same as the second three-dimensional insertion image.

15. The method of claim 11, wherein the second three-dimensional insertion image is an enlarged version of the first three-dimensional insertion image.

16. A display device, comprising:
a processor configured to:
receive image data for a content image,
determine a modulation region and a peripheral region in the content image based on at least one of a first position derived from a mouse device and a second position derived from an eye detecting device,
generate a left-eye content image and a right-eye content image based on the image data for the content image such that the modulation region has a three-dimensional depth, and
periodically change the three-dimensional depth of the modulation region by changing a modulation distance between the modulation region in the left-eye content image and the modulation region in the right-eye content image based at least in part on a periodic modulation reference timing; and
a display unit connected to the processor and configured to display the left-eye content image and the right-eye content image.

17. The device of claim 16, wherein a period of the modulation reference timing is substantially the same as a desired blinking period of eyes.

18. The device of claim 16, wherein the processor is further configured to:
modulate the content image from a two-dimensional image to a three-dimensional image; and
adjust the modulation distance to change the three-dimensional depth of the modulation region.

19. The device of claim 16, wherein the processor is further configured to:
adjust the modulation distance to a first distance at a first modulation frame period prior to the modulation reference timing such that the three-dimensional depth of the modulation region has a first depth; and
adjust the modulation distance to a second distance at a second modulation frame period subsequent to the modulation reference timing such that the three-dimensional depth of the modulation region has a second depth.

20. The device of claim 16, wherein the processor is further configured to:
gradually change the modulation distance from an initial distance to a first distance during a time period from a start frame period prior to the modulation reference timing to the modulation reference timing such that the three-dimensional depth of the modulation region has a first depth; and
suddenly change the modulation distance from the first distance to a second distance at an end frame period directly subsequent to the modulation reference timing such that the three-dimensional depth of the modulation region has a second depth.

* * * * *